United States Patent Office 2,800,494
Patented July 23, 1957

2,800,494

UNSATURATED FLUOROCARBON SILANES AND THEIR HYDROLYSIS PRODUCTS

Loren A. Haluska, Midland, Mich., assignor to Dow Corning Corporation, Midland, Mich., a corporation of Michigan No Drawing. Application October 22, 1954, Serial No. 464,181

13 Claims. (Cl. 260—448.2)

This invention relates to unsaturated fluorocarbon silanes and to the siloxanes derived therefrom.

This application is a continuation-in-part of applicant's copending application Serial No. 374,449, filed August 14, 1953, which in turn is a continuation-in-part of his application Serial No. 321,059, filed November 17, 1952, both now abandoned.

Organopolysiloxanes in which the organic groups attached to the silicon are hydrocarbon radicals, particularly methyl and phenyl radicals, have proven to be materials of great commercial utility due to the combination of thermal stability both at high and low temperatures and of unusually good temperature viscosity coefficients. Furthermore, organopolysiloxanes can be easily fabricated into resins and rubber articles and are hence admirably adaptable for commercial use. By the same token fluorocarbons also possess desirable properties. Their thermal stability approaches or is equal to that of the siloxanes while at the same time they have a better resistance to hydrocarbon solvents. As a consequence it is desirable to prepare materials possessing the desirable properties of both siloxanes and the fluorocarbons. Specifically, it is desired to prepare materials possessing the ease of fabrication, thermal stability of the siloxanes and the resistance to solvents and to the chemical reagents of the fluorocarbons.

It is an object of this invention to prepare organopolysiloxanes which possess the above characteristics. Another object is to prepare organopolysiloxanes containing a reactive linkage which can be copolymerized with other unsaturated organic compounds. Another object is to provide novel compositions of matter which can be easily prepared on a commercial scale at a reasonable price.

Other objects and advantages will be apparent from the following description.

This invention relates to silanes of the formula $$(C_aX_bF_{2a-b-c})_nR_mSiY_{4-m-n}$$

in which $a$ is an integer of at least 2, X is chlorine or hydrogen, $b$ has a value from 0 to 1 inclusive, $c$ is 1 or 3, $n$ has a value from 1 to 2 inclusive, R is a monovalent hydrocarbon radical, $m$ has a value from 0 to 3 inclusive and Y is chlorine or fluorine. Only one Y on each silicon is fluorine.

The novel silanes of this invention can have either 1 or 2 of the above-defined fluorinated radicals attached to the silicon. In event that there are two fluorocarbon radicals on the silicon they may be either the same or different radicals. It can also be seen that silanes of this invention include both unsaturated linear fluorinated radicals attached to the silicon in which case the formula is $(C_aX_bF_{2a-b-1})_nR_mSiY_{4-m-n}$, for example, trifluorovinylmethyldichlorosilane and unsaturated cyclic fluorinated radicals in which case the formula of the silanes is $(C_aX_bF_{2a-b-3})_nR_mSiY_{4-m-n}$ such as, for example, perfluorocyclobutenyltrichlorosilane.

The best general method for preparing the silanes of this invention is that of reacting unsaturated fluorocarbons with a chlorosilane having 1 or 2 hydrogens attached to the silicon, at atmospheric pressure at temperatures from 350–600° C. Under these conditions the mechanism of reaction appears to be the addition of the silane across the double bond with subsequent cleavage of a hydrogen halide to regenerate an unsaturated radical on the silicon. If the hydrogen halide is HF, some of the silicon bonded chlorine may be replaced by fluorine. An example of the reaction is

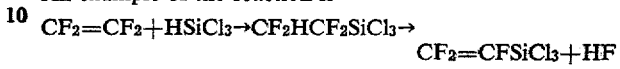
$$CF_2=CF_2+HSiCl_3 \rightarrow CF_2HCF_2SiCl_3 \rightarrow$$
$$CF_2=CFSiCl_3+HF$$

This reaction may also proceed through the cleavage of a chlorine atom as, for example

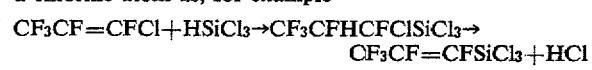
$$CF_3CF=CFCl+HSiCl_3 \rightarrow CF_3CFHCFClSiCl_3 \rightarrow$$
$$CF_3CF=CFSiCl_3+HCl$$

When it is desired to substitute one of the above fluorocarbon groups on the silicon, trichlorosilane is reacted with the unsaturated fluorocarbon. When it is desired to put two of the fluorocarbon groups on the silicon, dichlorosilane is employed. In the event it is desired to put two different groups on the silicon, a mixture of two different unsaturated fluorocarbons is reacted with dichlorosilane.

An alternative method of preparing the compounds of this invention is that of reacting a diolefin such as, for example, hexafluorobutadiene with a chlorosilane containing hydrogen bonded to the silicon, at superatmospheric pressure in a closed system. Under these conditions the silane will add to one of the double bonds to give the compounds of this invention and the radical normally contains one hydrogen atom, i. e.

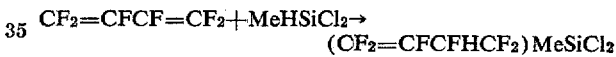
$$CF_2=CFCF=CF_2+MeHSiCl_2 \rightarrow$$
$$(CF_2=CFCFHCF_2)MeSiCl_2$$

The compounds of this invention can contain any monovalent hydrocarbon radical in addition to the fluorocarbon radicals supra. These silanes can be prepared by two methods. One is the Grignard method. In this method the desired fluorocarbon silane is first prepared and then reacted in the conventional manner with a Grignard reagent. By regulating the ratio of the chlorosilane to the Grignard reagent one can substitute from 1 to 3 monovalent hydrocarbon radicals on the silicon. By employing a mixture of two or more Grignard reagents two or more different R' groups can be substituted on the silicon. For example, the silane trifluorovinyltrichlorosilane can be converted into trifluorovinylphenylmethylchlorosilane by reacting the former with phenyl and methyl Grignard reagents. The Grignard method is preferred when R is an unsaturated aliphatic radical.

An alternative method for preparing the silanes having monovalent hydrocarbon radicals substituted therein is that of reacting the unsaturated fluorocarbons with silanes of the formula $R_xH_ySiCl_{4-(x+y)}$ where R is as above defined, $x$ and $y$ each have a value from 1 to 3 inclusive and the sum of $x+y$ is not greater than 4. This method is operative with any monovalent hydrocarbon radical but is best employed when R is a saturated aliphatic hydrocarbon radical or an aryl hydrocarbon radical. The reaction is best carried out at atmospheric pressure in the temperature range above shown.

More specifically the following types of hydrocarbon silanes can be reacted with the fluorocarbons: $RHSiCl_2$, $R_2HSiCl$, $R_3SiH$, $RH_2SiCl$, $RH_3Si$, and $R_2SiH_2$. Specific examples of such silanes are ethyldichlorosilane, ethylpropylchlorosilane, trimethylsilane, phenylmonochlorosilane, vinylsilane, dicyclohexylsilane, tolyldichlorosilane, benzylmonochlorosilane, xenyldichlorosilane and cyclohexyldichlorosilane.

The fluorocarbons employed as reactants in this invention are well-known materials. They may be prepared by a variety of known processes including interchange reactions between antimony perfluoride and the corresponding chlorinated compounds and decarboxylation of fluorinated carboxylic acids. The latter is the more general reaction and may be represented schematically by the equation $$-CF_2CF_2COONa \rightarrow -CF=CF_2+CO_2+NaF$$

This pyrolysis of the acid salts is generally carried out at temperatures from 225° C. to 375° C.

In the compositions of this invention the fluorocarbon radicals on the silicon can contain any number of carbon atoms above 1. Thus the radicals can range from fluorinated vinyls to fluorinated octadecenyl radicals or above. These radicals may contain 1 chlorine atom or 1 hydrogen atom. Thus, specific examples of fluorocarbons which can be reacted to form the compounds of this invention are perfluorocyclobutene, perfluorocyclopentene, perfluorocyclohexene, $CF_3CCl=CClF$, $CF_3CF=CCl_2$, $CF_3CCl=CF_2$ $CClF_2CF=CF_2$, $CHCl=CFCF_3$, $CF_3CCl=CClCF_3$ $CF_3CH=CClCF_3$, $C_7ClF_{13}$, and $C_{16}F_{33}CF=CF_2$.

This invention further relates to the hydrolysis products of the silanes supra, namely, siloxanes having the unit formula $$(C_aX_bF_{2a-b-c})_nR_sSiO_{\frac{4-n-z}{2}}$$

where $a$, $X$, $b$, $c$, $R$ and $n$ are as above defined and $z$ has a value from 0 to 2 inclusive.

Using R' to represent the defined fluorocarbon radicals it can be seen that this invention includes siloxanes of the following general formulae: $R'SiO_{1.5}$, $R'_2SiO$, $R'RSiO$, $R'R_2SiO_{.5}$, and $R'_2RSiO_{.5}$. The siloxanes may be homopolymers in which all of the polymer units are alike or they may be copolymers comprising any combination of the above type units. In addition this invention includes within its scope copolymers of 1 or more of the fluorocarbon substituted siloxanes of this invention with 1 or more hydrocarbon substituted siloxanes or with unsubstituted siloxanes (i. e., $SiO_2$ units). The siloxanes can also contain silicon bonded hydrogen atoms. In these copolymeric siloxanes the average ratio of total organic groups to silicon is from .5 to 3.

Specific examples of homopolymeric siloxanes which are within the scope of this invention are trifluorovinyl siloxane, hexafluorobutenyl methyl siloxane, bis-chlorodifluorovinyl siloxane, pentafluoropentenyl butyl vinyl siloxane, eptafluorobutenyl chlorohexafluorobutenyl siloxane, heptafluorocyclopentenyl octadecyl siloxane, chlorodifluorovinyl ethyl siloxane, and cyclohexyl trifluorovinyl siloxane. Specific examples of copolymers within the scope of this invention are combinations of trifluorovinyl siloxane and bis-trifluorovinyl siloxane; bis-trifluorovinyl siloxane, bis-pentafluorocyclobutenyl siloxane and chlorodifluorovinyl dimethyl siloxane; hexafluorobutenyl siloxane $(CF_3CF_2CH=CFSiO_{3/2})$ and bis-hexafluorobutenyl phenyl siloxane; $C_{16}H_{33}CF=CFSiO_{3/2}$ and chlorohexafluorocyclopentenyl siloxane; hexafluorobutenyl butyl siloxane and trifluorovinyl ditolyl siloxane; dimethylsiloxane and trifluorovinyl ethyl siloxane; bis-trifluorovinyl methyl siloxane, monophenylsiloxane and monomethylsiloxane; bis-trifluorovinyl propyl siloxane and trimethylsiloxane; and trifluorovinyl methyl siloxane, methylhydrogen siloxane and trimethylsiloxane. Also this invention includes copolymers which contain unsubstituted siloxane units such as copolymers of bis-chlorodifluorovinyl siloxane and $SiO_2$; copolymers of trifluorovinyl dimethyl siloxane and $HSiO_{3/2}$ and copolymers of bis-trifluorovinyl methyl siloxane and $SiO_2$. It is to be understood that in all of the copolymers within the scope of this invention some of the silicon atoms have 1 or 2 of the above-defined fluorocarbon radicals attached thereto.

Any of the above siloxanes either homopolymers or copolymers can be prepared by conventional hydrolysis procedures. For example, the corresponding silanes may be mixed and added to a combination of water and an organic solvent such as ether, toluene or the like. The resulting siloxane is then washed free of acid and condensed by heating in the usual manner. It is to be understood that the above siloxanes include both completely condensed materials and those which contain silicon-bonded OH radicals.

The compositions of this invention are useful as coating compositions, electrical insulation, lubricants, hydraulic fluids and other uses in which a high degree of thermal stability and chemical inertness is required. They are particularly useful in those applications which require resistance to hydrocarbon solvents. In addition both the silanes and the siloxanes of this invention may be used as intermediate materials in the preparation of saturated organosilicon compounds by addition of halogens and other groups to the double bond in the fluorocarbon radical.

The organosilicon compounds of this invention may be copolymerized with unsaturated organic compounds via the double bond in the fluorocarbon radical. Organic compounds which can be so copolymerized with the silicon compounds are olefins, halogenated olefins and unsaturated acids, esters, fluorocarbons, ketones, aldehydes, amines, nitriles, nitro compounds, sulfides, ethers and amides.

The following examples are illustrative only and are not to be construed as limiting the invention which is properly delineated in the appended claims.

*Example 1*

203.3 g. of trichlorosilane and 100.4 g. of perfluorobutadiene was loaded into a 1 liter Aminco bomb and heated for 44 hours at a temperature from 200 to 250° C. The pressures encountered during the runs ranged up to 780 p. s. i. The bomb was unloaded and upon distillation there was obtained the compound, hexafluorobutenyl-3-trichlorosilane boiling at about 146° C. at atmospheric pressure.

Upon hydrolysis of this material, a resinous polysiloxane having the unit formula $CF_2=CFCHFCF_2SiO_{1.5}$ is obtained.

*Example 2*

A 1 liter Aminco bomb was loaded with 203.3 g. of trichlorosilane and 209.6 g. of chlorotrifluoroethylene and heated at 197 to 211° C. for 43 hours. Upon distillation of the reaction product, trifluorochloroethyl trichlorosilane boiling at 105 to 118° C. was obtained. This was a mixture of the isomeric compounds $(F_2HCCClF)SiCl_3$ and $(ClFHCCF_2)SiCl_3$ and the compound $CF_2=CFSiCl_3$. The latter was formed presumbly by the splitting out of HCl from the chlorotrifluoroethyl group during the reaction and was identified by infrared analysis.

Hydrolysis of the mixture gave a resinous polysiloxane in which the polymer units were of the formula $(ClFHCCF_2)SiO_{1.5}$ and $(F_2HCCClF)SiO_{1.5}$ and $(CF_2=CF)SiO_{1.5}$.

*Example 3*

An equimolar mixture of a symmetrical dichlorodifluoroethylene and methyldichlorosilane was added at the rate of .68 ml. per min. to a stainless steel tube heated at a temperature of from 450° C. to 500° C. The rate of addition was such that the contact time of the vapors at the specified temperature was 67.5 sec. The effluent vapors were condensed and distilled to give beta-chlorodifluorovinyl methyl dichlorosilane $[(ClFC=CF)MeSiCl_2]$ boiling point 121° C. at 740.8 mm.

The silane was hydrolyzed in dioxane solution and the resultant product was dissolved in ether and washed free of acid. The solvent was evaporated and there was obtained a fluid having the viscosity of 19.3 cs. at 25° C. This polysiloxane had the unit formula

[(ClFC=CF)MeSiO]

*Example 4*

A mixture of 1.1 g. mols of symmetrical difluorodichloroethylene and 1.1 g. mols of trichlorosilane was added over a period of 1.5 hrs. to a stainless steel tube heated at 450° C. The contact time of the mixed vapors in the tube was 41.5 sec. The effluent material was condensed and distilled to give beta-chlorodifluorovinyl trichlorosilane (ClFC=CFSiCl$_3$), boiling point 116 to 117° C. at 746.5 mm.

When this material was hydrolyzed in ether solution and the solvent is removed, a viscous resinous polysiloxane having the unit formula ClFC=CFSiO$_{1.5}$ is obtained.

*Example 5*

A mixture of 1 g. mol of 1,2 dichloro-3,3-4,4-5,5 hexafluorocyclopent-1-ene and 1.5 g. mols of methyldichlorosilane was added to a stainless steel tube heated at from 470° C. to 500° C. over a period of 6 hrs. The contact time of the vapors in the tube was 86 sec. The effluent materials were condensed and distilled to give 2 chloro-3,3,4,4-5,5 hexafluorocyclopent-1-enyl methyl dichlorosilane, boiling point 161° C. at 740 mm.

This material was hydrolyzed in ether solution and after washing free of acid and removing the solvent, an oily siloxane having the unit formula $$\begin{array}{c} F_2 \\ C \\ F_2C \diagup \quad \diagdown CCl \\ F_2C \text{——} C\text{—SiO} \\ | \\ Me \end{array}$$

was obtained.

*Example 6*

A mixture of 3.54 g. mols of methyldichlorosilane and 3.3 g. mols of chlorotrifluoroethylene was added to a quartz tube which was heated at a temperature of 438° C. to 448° C. over a period of 8 hrs. and 27 min. The contact time of the vapors at the specified temperature was 34 sec. The effluent materials were condensed and distilled to give trifluorovinyl methyl dischlorosilane [(F$_2$C=CF)MeCl$_2$], boiling point of 84° C. at 740 mm. and chlorodifluorovinyl methyl fluorochlorosilane

[(ClFC=CF)MeSiClF]

boiling point 94° C. at 740 mm.

These silanes were hydrolyzed in ether solution, washed free of acid and the solvent was evaporated to give a copolymeric siloxane oil having the unit formulae (F$_2$C=CF)MeSiO and (ClFC=CF)MeSiO.

*Example 7*

A mixture of 3.27 g. mols of chlorotrifluoroethylene and 5.11 g. mols of trichlorosilane was added to a quartz tube heated to a temperature of 462° C. to 508° C. over a period of 3 hrs. and 44 min. The contact time of the vapor at the specified temperature was 35 sec. The effluent materials were condensed and distilled to give trifluorovinyl trichlorosilane, boiling point 74 to 76° C. at 746.3 mm.

When this material is hydrolyzed in ether solution and the solvent evaporated, a viscous resinous siloxane having the unit formula F$_2$C=CFSiO$_{1.5}$ is obtained.

*Example 8*

When an equimolar mixture of 1,2 dichloro-3,3-4,4-5,5-6,6 octafluorocyclohex-1-ene and phenyldichlorosilane is reacted in the manner of Example 3, the compound 2 chloro-3,3-4,4-5,5-6,6 octafluorocyclohex-1-enyl phenyl dichlorosilane is obtained.

When this material is hydrolyzed in ether solution and the solvent is removed an oily siloxane having the unit formula $$\begin{array}{c} F_2 \\ C \\ F_2C \diagup \quad \diagdown CCl \\ F_2C \qquad C\text{—SiO} \\ \diagdown C \diagup \quad | \\ F_2 \qquad Ph \end{array}$$

is obtained.

*Example 9*

A mixture of 1,477 g. of 2-chloro-3,3,4,4,5,5-hexafluorocyclopent-1-ene and 886 g. of methyldichlorosilane were passed through a quartz tube at a temperature of 490 to 527° C. at an average rate of 3.7 ml. per minute. The resulting product was distilled to give $$\begin{array}{c} \qquad\qquad Me \\ F_2\text{———}SiCl_2 \\ F_2\text{\Large[} \quad \text{\Large]}H \\ F_2 \end{array}$$

B. P. 144° C. at 740 mm. and having a sp. gr. 25/20 of 1.481.

When this chlorosilane is hydrolyzed a fluid siloxane of the unit formula $$\begin{array}{c} \qquad\qquad Me \\ F_2\text{———}SiO \\ F_2\text{\Large[} \quad \text{\Large]}H \\ F_2 \end{array}$$

is obtained.

*Example 10*

A mixture of 574.1 g. of perfluoropropylene and 571 g. of methyldichlorosilane was passed through a quartz tube which was 4 feet long and had an inside diameter of 1 inch. The mixed materials were passed through the tube at a constant rate over a period of 194 minutes at a temperature of 467 to 487° C. Upon distillation of the product the chlorosilanes $$CF_3CF=CFSiCl_2\overset{Me}{\phantom{X}}$$

and $$CF_3CF=CFSiClF\overset{Me}{\phantom{X}}$$

were obtained.

When these materials were hydrolyzed a fluid siloxane of the unit formula $$CF_3CF=CFSiO\overset{Me}{\phantom{X}}$$

is obtained.

*Example 11*

A copolymer of 10 mol percent trifluorovinyl methyl siloxane and 90 mol percent dimethylsiloxane was prepared by copolymerizing trifluorovinyl methyl siloxane and dimethylsiloxane in the presence of hydrochloric acid. The resulting copolymer was a viscous material.

100 parts of the copolymer was milled with 40 parts by weight of a fume silica and .5 part by weight benzoylperoxide and then heated in a press 10 minutes at 125° C. The resulting rubber was then cured 24 hours at 250° C. and produced an elastomeric material showing only 10.5% swell when immersed in ASTM oil No. 3 for 24 hours at 150° C. By contrast a standard commerical dimethylpolysiloxane rubber which has been vulcanized with benzoylperoxide and contains an identical amount of the same fume silica filler will exhibit a swell of about 50% when subjected to the same ASTM test.

Example 12

When 1 g. mol of trimethylsilane and 1 g. mol of perfluoropropylene are mixed and reacted in a hot tube in accordance with the procedure of Example 9, the compound trimethyl pentafluoropropenyl silane is obtained.

Trimethyl silane can be prepared by reducing trimethylchlorosilane with lithium aluminum hydride in diethyl ether solution.

Example 13

When the following fluorocarbons are reacted with the following silanes in the amounts shown and in accordance with the procedure of Example 9 the respective chlorosilanes are obtained. When these chlorosilanes are hydrolyzed the respective siloxanes shown are obtained.

| Fluorocarbon | Silane | Molar Ratio | Product | Siloxane | Physical State |
|---|---|---|---|---|---|
| $CF_2=CF_2$ | $H_2SiCl_2$ | 2/1 | $(CF_2=CF)_2SiCl_2$ | $(CF_2=CF)_2SiO$ | Fluid. |
| $CF_3CCl=CClCF_3$ | $HSiCl_3$ | 1/1 | $CF_3CCl=CSiCl_3$<br>\|<br>$CF_3$ | $CF_3CCl=CSiO_{3/2}$<br>\|<br>$CF_3$ | Resin. |
| $F_2C-CF$<br>\|  \|\|<br>$F_2C-CF$ | $MeSiHCl_2$ | 1/1 | Me<br>\|<br>$F_2C-CSiCl_2$<br>\|  \|\|<br>$F_2C-CF$ | Me<br>\|<br>$F_2C-CSiO$<br>\|  \|\|<br>$F_2C-CF$ | Fluid. |
| $C_{16}H_{33}CF=CF_2$ | $HSiCl_3$ | 1/3 | $C_{16}H_{33}CF=CFSiCl_3$ | $C_{16}H_{33}CF=CFSiO_{3/2}$ | Solid. |

Example 14

When one mol of trifluorovinyltrichlorosilane is reacted with 1 mol of allyl magnesium chloride in diethyl ether the compound trifluorovinylallyl dichlorosilane is obtained.

When 1 mol of trifluorovinyltrichlorosilane is reacted with 1 mol of octadecyl magnesium chloride in diethyl ether, trifluorovinyl octadecyl dichlorosilane is obtained.

When 1 mol of trifluorovinyl allyl dichlorosilane, 1 mol of trifluorovinyl octadecyl dichlorosilane and 1 mol of methyltrichlorosilane are cohydrolyzed, a copolymer having the composition 33⅓ mol percent trifluorovinyl allyl siloxane, 33⅓ mol percent trifluorovinyl octadecyl siloxane, and 33⅓ mol percent monomethylsiloxane is obtained.

That which is claimed is:

1. A composition of matter having the formula $$(C_aX_bF_{2a-b-c})_nR_mSiY_{4-m-n}$$

in which the fluorinated radicals contain at least 2 fluorine atoms and are selected from the group consisting of unsaturated linear fluorinated radicals in which $c$ is 1 and unsaturated cyclic fluorinated radicals in which $c$ is 3 and in which fluorinated radicals $a$ is an integer of at least 2, X is selected from the group consisting of chlorine and hydrogen, $b$ has a value from 0 to 1 inclusive, $n$ has a value from 1 to 2 inclusive, R is a monovalent hydrocarbon radical, $m$ has a value from 0 to 3 inclusive and Y is of the group consisting of chlorine and fluorine there being no more than one fluorine atom per Si.

2. A silane of the formula $(CF_2=CF)_nR_mSiCl_{4-m-n}$ in which $n$ has a value from 1 to 2 inclusive, R is a monovalent hydrocarbon radical and $m$ has a value from 0 to 3 inclusive.

3. A composition in accordance with claim 2 where R is a methyl radical.

4. A silane of the formula $(ClFC=CF)_nR_mSiCl_{4-m-n}$ in which $n$ has a value from 1 to 2 inclusive, R is a monovalent hydrocarbon radical and $m$ has a value from 0 to 3 inclusive.

5. A composition in accordance with claim 4 in which R is methyl.

6. A method of preparing siloxanes which comprises hydrolyzing a chlorosilane of the formula $$(C_aX_bF_{2a-b-c})_nR_mSiY_{4-m-n}$$

in which the fluorinated radicals contain at least 2 fluorine atoms and are selected from the group consisting of unsaturated linear fluorinated radicals in which $c$ is 1 and unsaturated cyclic fluorinated radicals in which $c$ is 3 and in which fluorinated radicals $a$ is an integer of at least 2, X is selected from the group consisting of chlorine and hydrogen, $b$ has a value from 0 to 1 inclusive, $n$ has a value from 1 to 2 inclusive, R is a monovalent hydrocarbon radical, $m$ has a value from 0 to 3 inclusive and Y is of the group consisting of chlorine and fluorine, there being no more than one fluorine atom per Si, in the presence of a solvent and thereafter removing the solvent and condensing the siloxane by heating.

7. A siloxane of the unit formula $$(C_aX_bF_{2a-b-c})_nR_zSiO_{\frac{4-z-n}{2}}$$

in which the fluorinated radicals contain at least 2 fluorine atoms and are selected from the group consisting of unsaturated linear fluorinated radicals in which $c$ is 1 and unsaturated cyclic fluorinated radicals in which $c$ is 3 and in which fluorinated radicals $a$ is an integer of at least 2, X is selected from the group consisting of chlorine and hydrogen, $b$ has a value from 0 to 1 inclusive, $n$ has a value from 1 to 2 inclusive, R is a monovalent hydrocarbon radical and $z$ has a value from 0 to 2 inclusive.

8. A siloxane of the unit formula $$(CF_2=CF)_nR_zSiO_{\frac{4-z-n}{2}}$$

in which $n$ has a value from 1 to 2 inclusive, R is a monovalent hydrocarbon radical and $z$ has a value from 0 to 2 inclusive.

9. A siloxane in accordance with claim 8 where R is methyl.

10. A siloxane of the formula $(ClFC=CF)_nR_zSiO_{4-z-n}$ in which $n$ has a value from 1 to 2 inclusive, R is a monovalent hydrocarbon radical and $z$ has a value from 0 to 2 inclusive.

11. A composition in accordance with claim 10 in which R is methyl.

12. A copolymeric siloxane composed of silicon atoms linked through oxygen atoms, some of the silicon atoms having at least 1 and not more than 2 fluorocarbon radicals of the formula $C_aX_bF_{2a-b-c}$ in which the fluorinated radicals contain at least 2 fluorine atoms and are selected from the group consisting of unsaturated linear fluorinated radicals in which $c$ is 1 and unsaturated cyclic fluorinated radicals in which $c$ is 3 and in which fluorinated radicals $a$ is an integer of at least 2, X is selected from the group consisting of chlorine and hydrogen, $b$ has a value from 0 to 1 inclusive and said radicals being linked to the silicon atoms through Si—C bonds, any remaining valences of the silicon atoms in said copolymer being satisfied by radicals of the group consisting of monovalent hydrocarbon radicals and hydrogen atoms and in said copolymer the total number of fluorocarbon and monovalent hydrocarbon radicals being on the average from .5 to 3 per silicon atom.

13. A siloxane composed of silicon atoms linked through oxygen atoms, some of the silicon atoms having at least one and not more than two fluorocarbon radicals of the formula $C_aX_bF_{2a-b-c}$ in which the fluorinated radicals contain at least 22 fluorine atoms and are selected from the group consisting of unsaturated linear fluorinated radicals in which $c$ is 1 and unsaturated cyclic fluorinated radicals in which $c$ is 3 and in which fluorinated radicals $a$ is an integer of at least 2, X is selected from the group consisting of chlorine and hydrogen, $b$ has a value from 0–1 inclusive and said radicals being linked to the silicon atoms through Si—C bonds, any remaining valences of the silicon atoms in said siloxane being satisfied by radicals of the group consisting of monovalent hydrocarbon radicals and hydrogen atoms and in said siloxane the total number of fluorocarbon and monovalent hydrocarbon radicals being on the average from .5 to 3 per silicon atom.

References Cited in the file of this patent

FOREIGN PATENTS 961,878     France ---------------- Nov. 29, 1949

UNITED STATES PATENT OFFICE

CERTIFICATE OF CORRECTION

Patent No. 2,800,494             July 23, 1957

Loren A. Haluska

It is hereby certified that error appears in the printed specification of the above numbered patent requiring correction and that the said Letters Patent should read as corrected below.

Column 3, line 53, for "eptafluorobutenyl" read --heptafluorobutenyl--; column 5, line 50, for "dischlorosilane" read --dichlorosilane--; line 53, for "[(ClFC=CF)MeSiClF]" read --[(ClFC=CF)MeSiClF] --; column 9, line 9, for "22 fluorine atoms" read --2 fluorine atoms--.

Signed and sealed this 22nd day of October 1957.

(SEAL)
Attest:

KARL H. AXLINE
Attesting Officer

ROBERT C. WATSON
Commissioner of Patents